UNITED STATES PATENT OFFICE.

HEINRICH REITZ, OF GRIESHEIM-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION OF GERMANY.

PREPARING CAUSTIC SODA.

971,144.  Specification of Letters Patent.  Patented Sept. 27, 1910.

No Drawing.  Application filed December 20, 1909.  Serial No. 534,121.

*To all whom it may concern:*

Be it known that I, HEINRICH REITZ, a subject of the German Emperor, and resident at Griesheim-on-the-Main, Germany, have invented certain new and useful Improvements in Preparing Caustic Soda, of which the following is a specification.

Solid caustic soda has hitherto been produced by evaporating caustic soda lye in iron vessels *in vacuo*, or otherwise until a dry product is obtained. This process has the disadvantage that all the impurities of the lye are contained in the final product.

If caustic soda lye of a concentration of more than fifty per cent. be kept in motion while cooling, crystals of anhydrous caustic soda, containing one or two molecular proportions of water, gradually separate and a pulp of crystals is gradually produced which solidifies only on being further cooled. Thus if caustic soda lye of 50° Baumé be concentrated to a content of 65 per cent. by weight of NaOH, and if it be then cooled to 55° centigrade, 50 per cent. of the amount of NaOH used is obtained in the form of crystals, consisting for the greater part of NaOH+1Aq. These crystals, which contain about 70 per cent. by weight of NaOH, cannot be utilized commercially, but must be melted again until they contain from 96, to 98, per cent. NaOH, the usual commercial product. This operation involves a great expenditure of fuel and cost generally.

If it be desired to directly obtain pure caustic soda, that is crystals containing 100 per cent. of NaOH, the concentration must be carried to about 90 per cent. in order to obtain a remunerative yield of crystals. A melt of caustic soda of 90 per cent. will, however, on cooling, while being kept in motion, become, at about 200° centigrade, of such granular condition that separation of the crystals from the mother lye is impossible. At from 220°, to 230°, centigrade, separation, from the mother lye, of the crystals of caustic soda which have been precipitated in a fairly large amount could still be carried out, but technical difficulties are met in effecting the separation at such a high temperature. For instance, it is not possible to keep a centrifugal machine at such a high temperature, and the yield is, under such conditions, not so high as is obtained by the process hereinafter described. The specifications of German Patents Nos. 117,748 and 189,835 describe processes based on the aforesaid mode of operation for the production of caustic potash crystals. I have discovered that these high temperatures can be avoided in a simple manner in the manufacture of 100 per cent. NaOH, if, after the abundant precipitation of 100 per cent. caustic soda crystals, the solidification point of the remaining mother lye, which contains the whole of the impurities, be lowered by the addition of a more diluted melt of caustic soda. Contrary to what might be expected, only a small re-dissolution of the anhydrous crystals formed takes place. The temperature can then be reduced considerably below 200° centigrade so that separation of the crystals from the mother lye offers no longer any difficulty, and, the lower temperature enables a considerably increased yield of 100 per cent. NaOH to be obtained.

The following example will illustrate how this invention can be performed but the invention is not limited to the details of this example.

In order to obtain a high yield of pure, anhydrous caustic soda crystals by starting, for instance, from a 50° Baumé caustic soda lye having about 35 grams of foreign salts per liter, the operation can be conducted as follows: The said lye is evaporated to a temperature of from 280° to 290° centigrade, if the evaporation is effected at ordinary pressure, and at a temperature of 220 to 230° centigrade, if the evaporation takes place in a vacuum, until its contents of caustic soda is about 90 per cent. and the melt thus obtained is allowed (while stirring) to stiffen to a thick pulp, the temperature lowering to from 210°, to 220°, centigrade. Then, while the mass is further cooled and stirred, it is admixed, gradually, with a melt of caustic soda having a temperature of from 120°, to 130°, centigrade and containing from 70, to 73, per cent. of NaOH and having a weight equal to one-sixth of that of the 90° melt. The solidification point of such a melt is about 100° centigrade. The crystals are then separated from the mother lye at about 170° centigrade and crystals are formed which contain 99 per cent. of NaOH and represent as much as 80 per cent. of the 90 per cent. melt. The mother lye contains almost the whole of the impurities which were contained in the original lye.

The temperature required for the separation depends on the amount of additional lye. If less additional lye be used than that mentioned in the foregoing example, the separation must take place at a higher temperature, the yield is, however, smaller. If more additional lye be used, the temperature at which the crystals and mother lye are separated can be lowered while at the same time the yield is higher. The treatment of the mother lye in accordance with the same process presents no difficulties, so long as the impurities which it contains are not such that any important crystallizing out thereof occurs at the temperature at which the separation of the crystals from the mother lye takes place.

The concentration of the melt to be purified, the quantity of additional diluting lye, its content of NaOH, and the temperature of the separation of the crystals from the mother lye, will be varied according to the contents of impurities.

I claim:—

In the manufacture of anhydrous caustic soda, concentrating ordinary caustic soda lye until a copious production of anhydrous caustic soda crystals is obtained, allowing the mother lye to form a thick pulp while being stirred, adding to this slowly while stirring a caustic soda lye of lower percentage, and separating the solid from the liquid at a temperature at which the added lye is still fluid.

In testimony whereof I have signed my name to this specification in the presence of two subscribing witnesses.

HEINRICH REITZ.

Witnesses:
 FRANZ HASSLACHER,
 ERWIN DEPPEL.